…

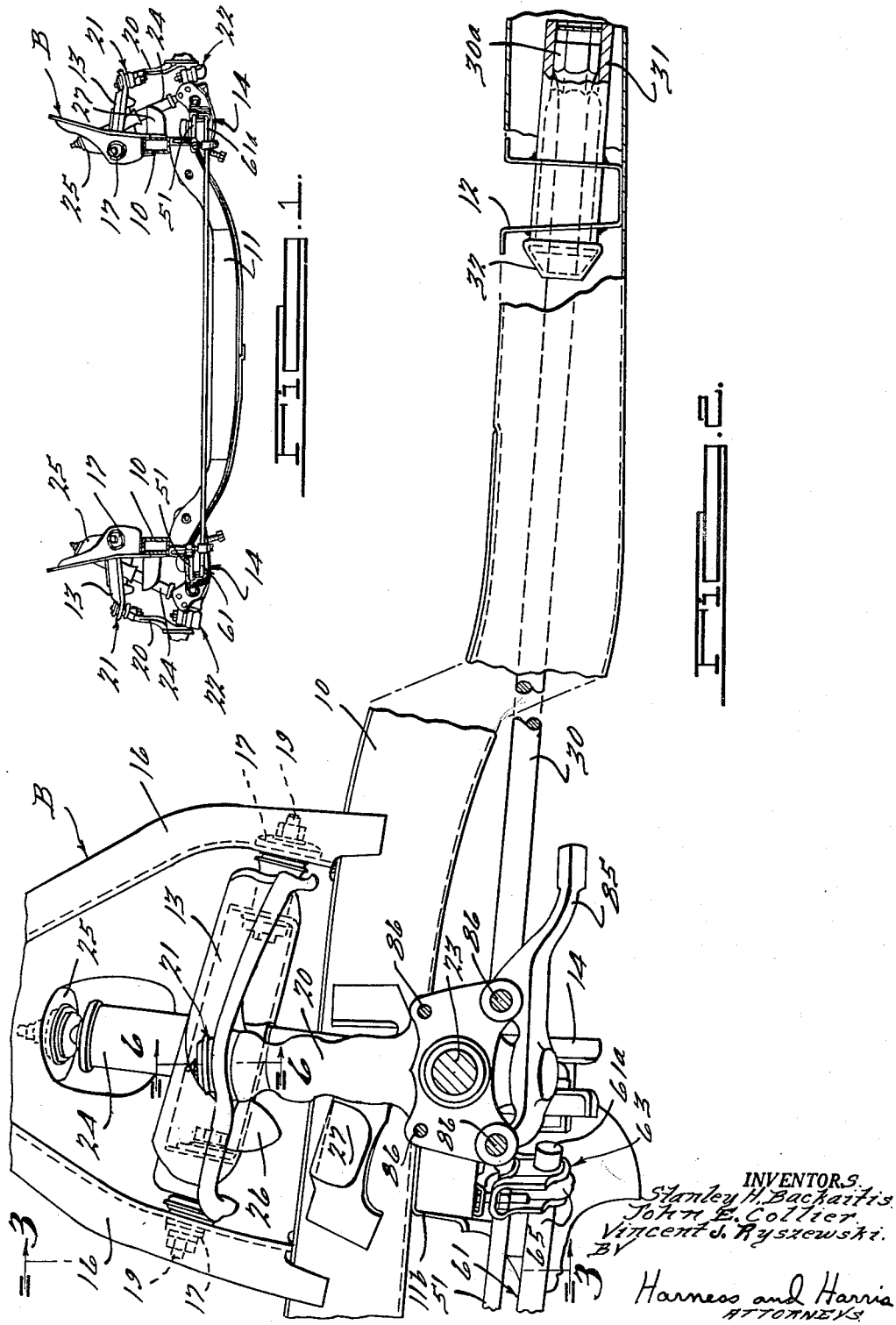

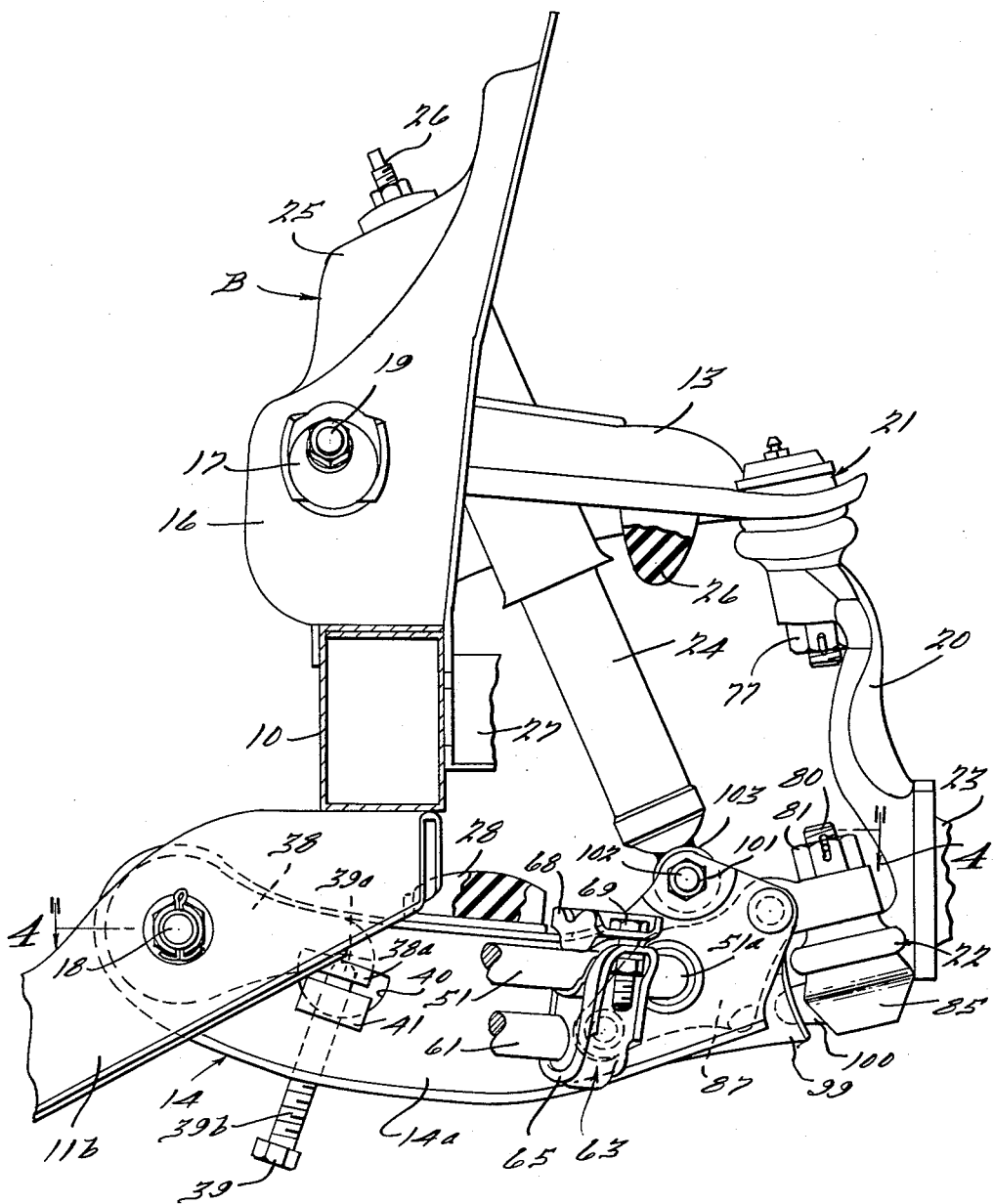

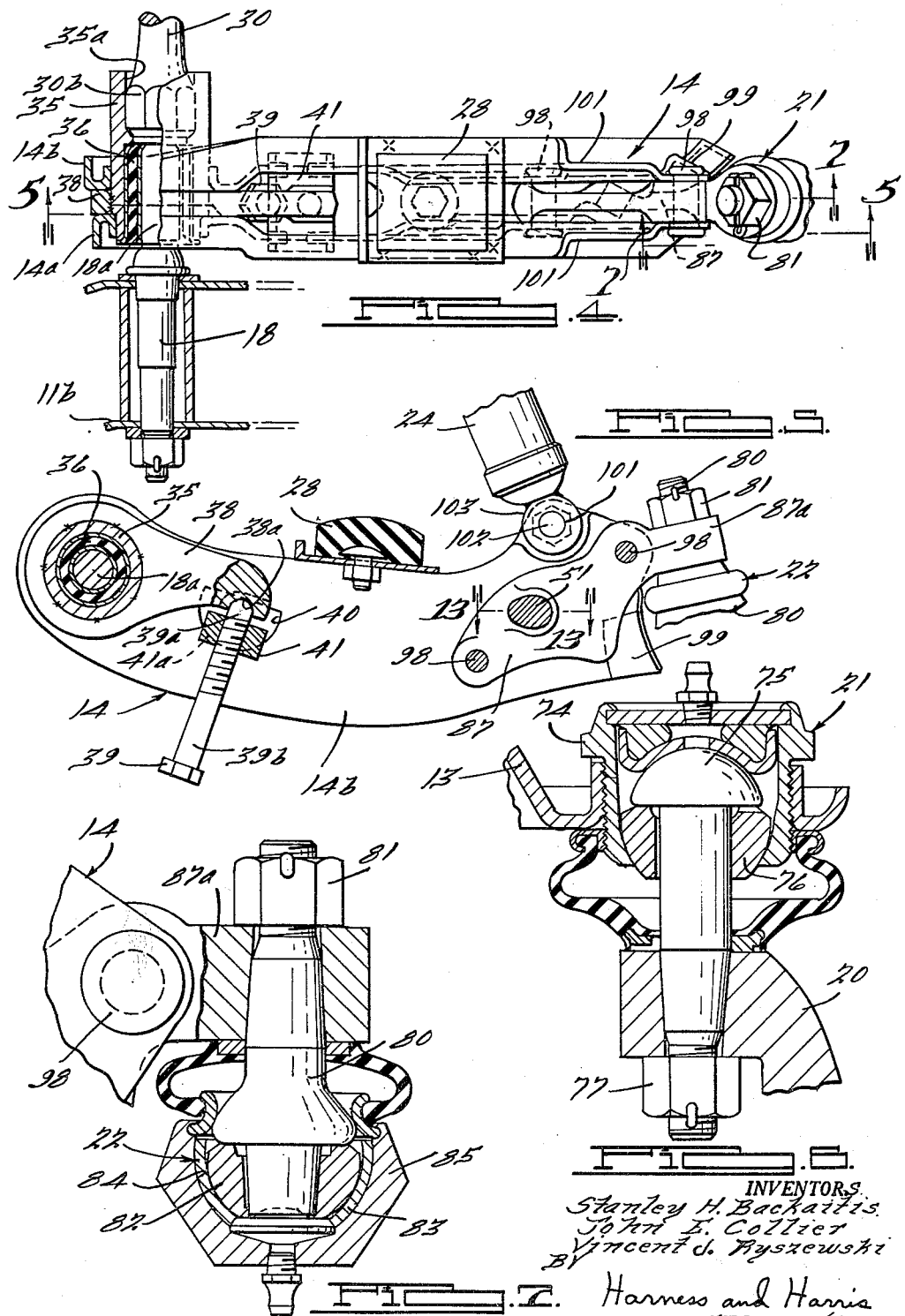

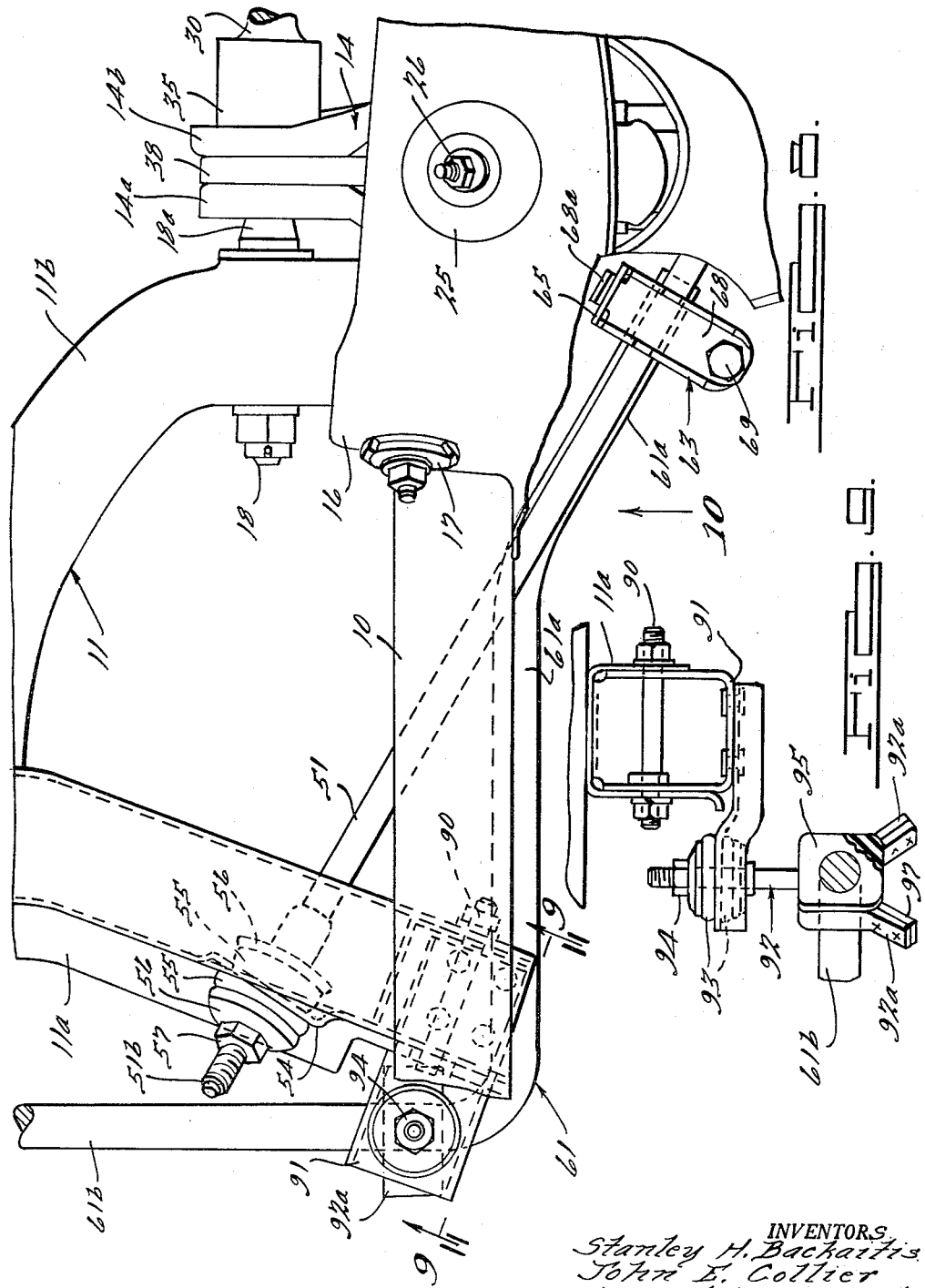

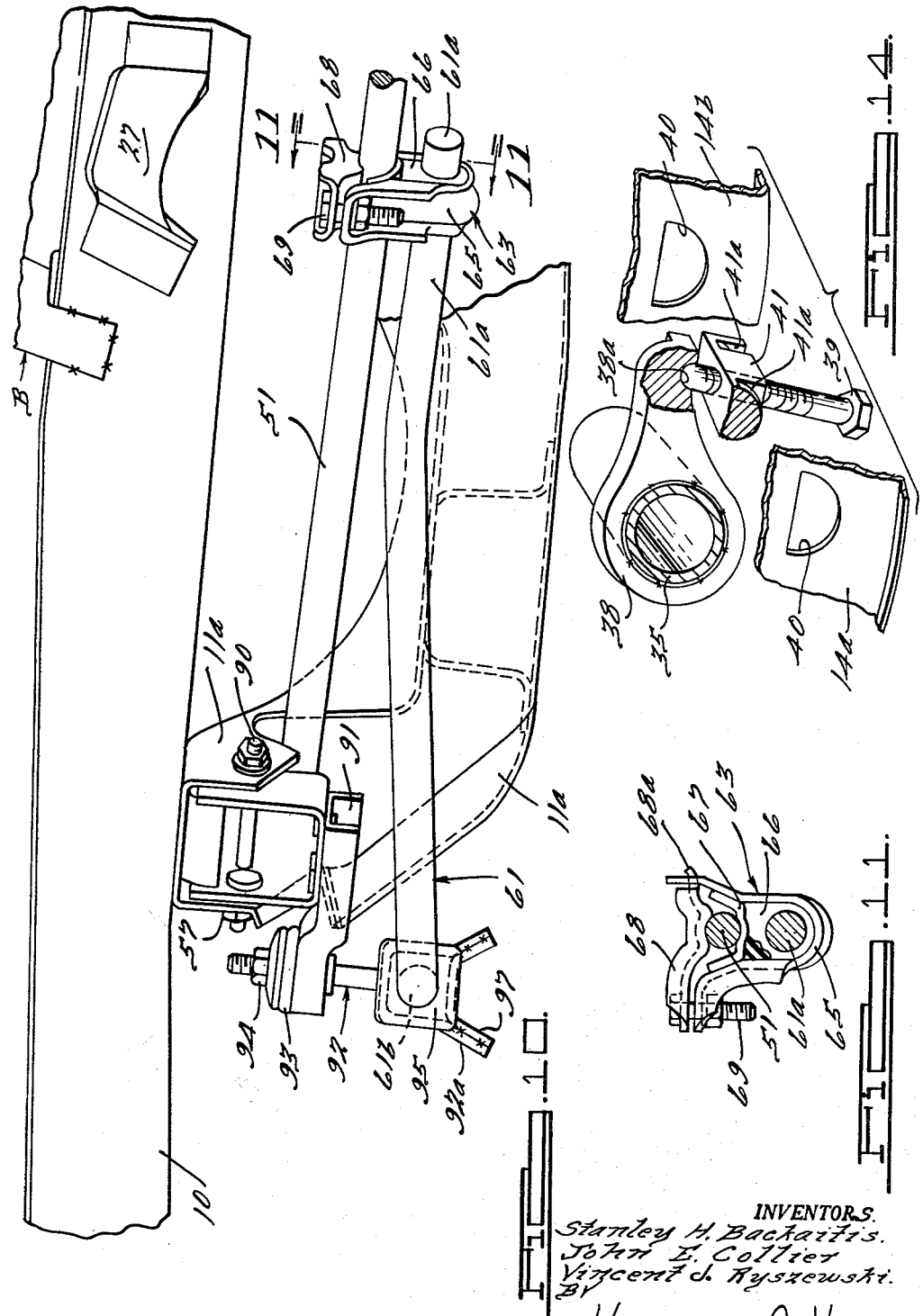

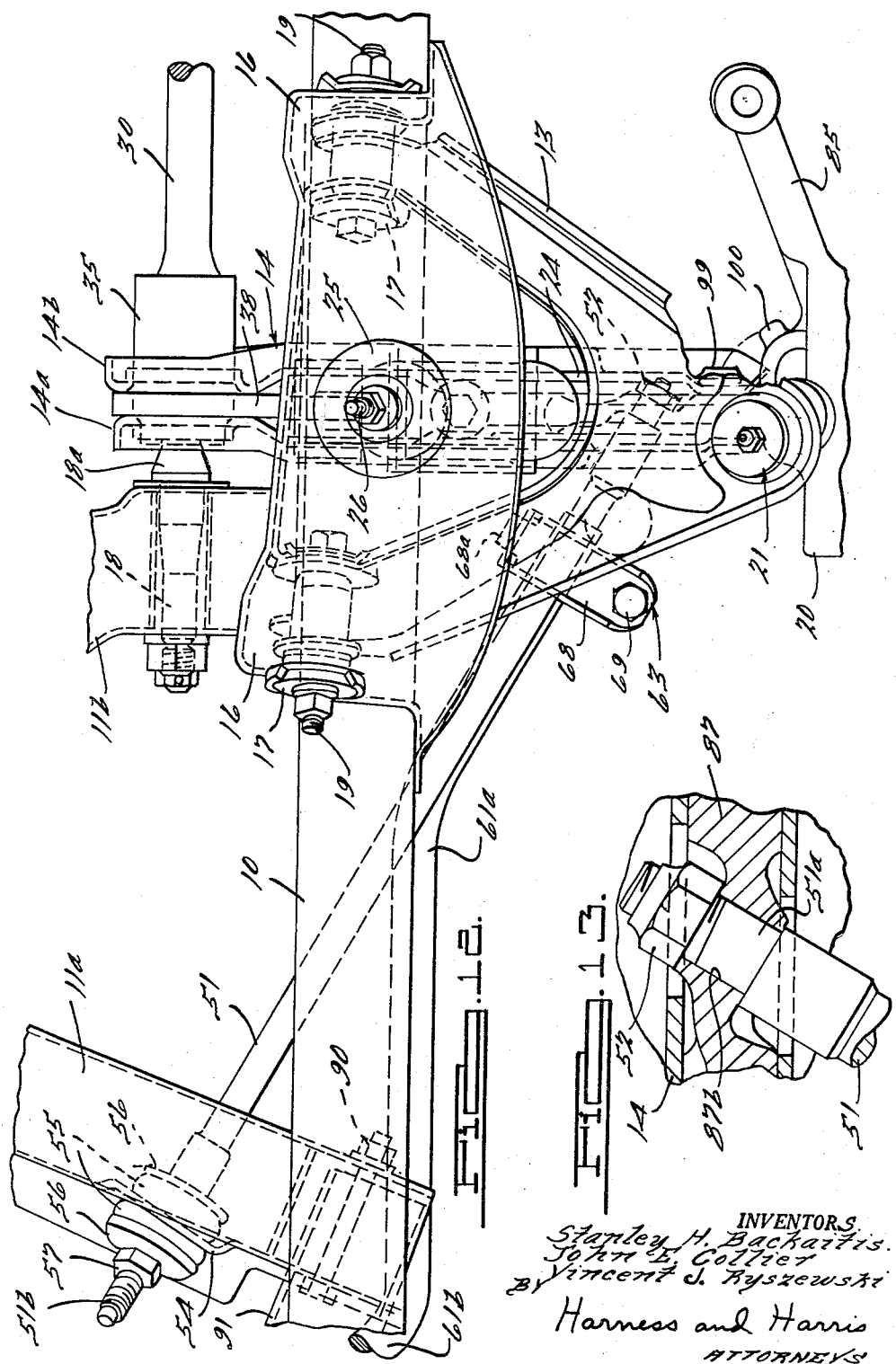

United States Patent Office 3,178,200
Patented Apr. 13, 1965

3,178,200
TORSION BAR WHEEL SUSPENSION
Stanley H. Backaitis, John E. Collier, and Vincent J. Ryszewski, Detroit, Mich., assignors to Chrysler Corporation, Highland Park, Mich., a corporation of Delaware
Filed Mar. 27, 1961, Ser. No. 98,343
2 Claims. (Cl. 280—96.2)

This invention relates to a torsion bar wheel suspension and particularly to the manner of adjustably mounting a torsion bar in a vehicle chassis having independently sprung wheels.

It is a primary object of this invention to provide an improved manner of connecting a torsion bar to a control arm of an independently sprung vehicle wheel such that ready adjustment of the torsion bar may be accomplished with maximum ease and accessibility.

It is another object of this invention to provide a torsion bar wheel suspension wherein the torsion bar can be placed at the lowest possible level that will still give the required road clearance and not interfere with any other portions of the vehicle body or chassis or with the preferred chassis geometry.

It is still another object of this invention to provide an adjustable, compression type, fail-safe, connection between one end of a torsion bar and its associated wheel supporting control arm.

It is still another object of this invention to provide a novel type of lower control arm formed from an elongated stamping and an attached end piece wherein various portions of the control arm provide structure that functions in a new and/or an improved manner.

It is another object of this invention to provide a novel construction for connecting a thrust strut between a control arm and the associated body structure;

It is still another object of this invention to provide a novel connection between the lower control arm and the shock absorber connected therewith.

This invention is an improvement over certain inventions disclosed in the U.S. patent of John E. Collier and Maurice D. Karlstad, Jr. No. 2,972,489 and in the pending U.S. patent application of Maurice D. Karlstad, Serial No. 828,486, filed July 21, 1959, now U.S. Patent 3,027,177.

Other objects and advantages of this invention will become readily apparent from a consideration of the following description and the related drawings wherein:

FIG. 1 is a fragmentary front end elevational view, partly in section of a vehicle body structure having a front wheel suspension assembly embodying this invention;

FIG. 2 is an enlarged, fragmentary, side elevational view of portions of the assembly shown in FIG. 1, certain portions of the assembly having been broken away and shown in section for the sake of clarity;

FIG. 3 is an enlarged sectional elevational view taken along the line 3—3 of FIG. 2;

FIG. 4 is a sectional elevational view taken along the line 4—4 of FIG. 3;

FIG. 5 is an enlarged, fragmentary, sectional elevational view of the lower control arm structure taken along the line 5—5 of FIG. 4, the view showing the adjustable connection between the torsion bar and lower control arm of the assembly, portions of the assembly being broken away for the sake of clarity;

FIG. 6 is an enlarged, sectional elevational view of the upper control arm ball joint connection of the wheel assembly shown in FIG. 1; the view being taken along the line 6—6 of FIG. 2;

FIG. 7 is an enlarged sectional elevational view taken along the line 7—7 of FIG. 4; showing the lower control arm ball joint connection of the front wheel suspension assembly;

FIG. 8 is an enlarged fragmentary top plan view of the front end of the front wheel suspension assembly showing the arrangement of the thrust link with respect to the lower control arm and the associated body front end cross member;

FIG. 9 is a fragmentary sectional elevational view taken along the line 9—9 of FIG. 8 showing a stabilizer bar support;

FIG. 10 is a side elevational view of the stabilizer bar, the view being taken in the direction of the arrow 10 of FIG. 8;

FIG. 11 is a sectional elevational view taken along the line 11—11 of FIG. 10;

FIG. 12 is an enlarged top plan view of the front wheel suspension assembly shown particularly in FIGS. 1–3 of these drawings;

FIG. 13 is an enlarged fragmentary sectional elevational view taken along the line 13—13 of FIG. 5; and FIG. 14 is a fragmentary perspective view of the torsion bar tension adjusting means, the view being in exploded form.

FIGS. 1–3 in particular of the drawings show a front end portion of a motor vehicle unitized body B having a wheel supporting assembly that includes longitudinally extending side rails 10 and a pair of transversely extending, longitudinally spaced, front and rear cross rails 11 and 12 respectively. Extending outwardly from and transversely of the side rail 10 and pivotally connected to body B for swinging movement about longitudinally extending pivot axes are upper and lower wheel supporting control arms 13 and 14 respectively. Upper control arm 13, which is substantially V-shaped in plan (see FIG. 12), is mounted on the frame side rail 10 by means of upstanding brackets 16 that support pivot pins 19 which include caster and camber adjustment means 17. Adjustment means 17 form no part of this invention. The disclosed adjustment means 17 is described in detail in the U.S. Patent 2,954,998 of Robert H. Kushler et al., issued October 4, 1960. The lower control arm 14 is pivotally mounted in the cantilever-type pivot shaft 18 that is supported by the frame front cross rail member 11b. Front cross rail 11 is a K-shaped frame composed of front and rear leg portions 11a and 11b, respectively. This K frame 11 supports the front engine mounts and the steering mechanism in addition to the front wheel suspension assembly. This pivot shaft 18 and its associated torsion bar connecting means will be described in detail hereafter.

Each pair of upper and lower control arms 13 and 14 have a wheel supporting knuckle 20 pivotally connected thereto by means of upper and lower ball joint connections 21 and 22 respectively. Knuckle 20 mounts a spindle 23 that is adapted to rotatably support a wheel (not shown). A shock absorber unit 24 is connected between the lower control arm 14 and a housing 25 seated on the frame side rail 10. Pivotal movement of the control arms 13, 14 is limited by engagement of the resilient bumpers 28, 26 with the frame mounted bumper bracket 27.

To provide for springing of the wheel supporting control arms 13, 14 the disclosed structure utilizes a torsion bar spring 30. Spring 30 has a hexagonally shaped rear end portion 30a (see FIG. 2) that is non-rotatably seated in the hexagonal socket in the cup-like sleeve 31 that is fixedly mounted in the frame cross rail 12. A boot 32 can be seated around the torsion bar 30 at the open end of the sleeve 31 to prevent the entrance of foreign matter into the socket connection.

As previously pointed out, a cantilever pivot shaft 18 (see FIGS. 4 and 12) is mounted in the frame cross member 11b so that a portion 18a thereof projects rearwardly to provide the bearing journal for the lower control arm 14. The cantilever pivot pin 18a preferably mounts a resilient bearing bushing 36 to absorb shock. Lower control arm 14 has a sleeve 35 extending transversely thereof and rotatably mounted therein for rotatable movement on pin 18a about an axis extending longitudinally of the body B. Non-rotatably connected to the outer peripheral surface of the sleeve 35 by splineways and/or welding 37 is a radially extending crank lever 38. Lever 38 has a hemispherical, downwardly opening depression or seat portion 38a that is adapted to receive the rounded upper end of a compression type adjustment bolt 39. Bolt 39 has a rounded head portion 39a that is adapted to be rockably mounted in the seat depression 38a formed in the crank 38. The lower control arm 14 has semi-circular openings 40 in its spaced side walls that rockably journal a bearing block 41. The threaded shank 39b of the adjustment bolt 39 is screwed through the bearing block 41 so that the head portion 39a thereof seats against depression 38a in the underside of the crank. From the foregoing description it is thought to be obvious that screwing bolt 39 upwardly through the bearing block 41 will cause counterclockwise rotation (see FIG. 3) of the crank 38 relative to the lower control arm 14. This rotation of the crank 38 and its attached sleeve 35 is utilized to adjust the pre-set torsional stress in the torsion bar 30 as will become apparent from the following description. While a tension stressed adjustment bolt has been used in the past as shown in the noted U.S. Patent 2,972,489, still, it has been found that there are certain marked advantages in using a compression type adjusting bolt. Stresswise the same bolt can stand a much greater compression load than a tension load. Also the application of the bolt loading through the rounded surface 39a to the surface 38a of the crank rather than through the threads of a tension bolt and nut as shown in Patent 2,972,489 is an obvious advantage. The rockable mounting of the bearing block 41 in the control arm apertures 40 permits the block to be shifted or to adjust itself as the bolt 39 is screwed through the block so that the bolt 39 can extend substantially normal to the crank arm 38 within the normal stress adjustment range of the torsion bar. This gives the best application of force with minimum loading of the various parts.

From FIGS. 5 and 6 particularly it will be noted that the lower control arm 14 and its attached sleeve 35 are rotatably mounted on the pivot pin journal 18a by means of a resilient bushing unit 36 of well-known construction. Resilient bushing units of this same type are also used to mount the upper control arm 13 on the pivot pins 19.

The rear end portion 35a of the sleeve 35 is provided with a hexagonal socket formation to matingly receive the hexagonally formed front end portion 30b of the torsion bar spring 30. A resilient boot (not shown) similar to the boot 32 used at the rear end of torsion bar 30 can also be used on the front end of the bar 30 to prevent the entrance of foreign matter into the non-rotatable connection of the front end portion 30b of the torsion bar spring 30 to the sleeve portion 35a of the crank 38.

With the torsion bar mounting heretofore described, it is thought to be apparent that the torsional bar 30 is coaxial with the lower control arm pivot pin 18 and, as can be seen from FIG. 2, extends rearwardly and downwardly from the horizontal. The rearwardly and downwardly extending torsion bar 30 provides a definite advantage in that it permits the vehicle floor above the torsion bar to be lowered the maximum amount. Furthermore, by having the torsion bar adjustment means 35, 38–41, located at the front end of the torsion bar 30 rather than at the rear end of the bar 30 adjacent the sleeve 31 the minimum amount of space need be used for the anchoring of the rear end of the torsion bar 30 to the rear cross rail 12 and therefore the vehicle floor in the area of the cross rail 12 can be located at the lowest possible level. Another advantage of the arrangement of the torsion bar stress adjusting means at the front end of the bar 30 is that it is in a position where it is readily accessible and in additioin it uses the bearing supported sleeve 35 for a dual function, namely, an anchor for the connection of the torsion bar 30 to the lower control arm 14 and a crank hub for rotatable adjustment of the front end of the bar 30. As the sleeve 35 must be used to connect the front end of the torsion bar 30 to the lower control arm 14 it is an economic, as well as a mechanical advantage, to add the crank 38 to the sleeve 35 and then use the sleeve 35 for both a connection member and a stress adjusting member. In addition space is not as such a premium at the front end of the torsion bar 30 so a larger size readily accessible adjusting means 38–41 can be used at the front end portion 30b of bar 30 whereas current car designs demand that the floor of the vehicle in the passenger area should be at the lowest possible level to give the maximum passenger comfort with the currently popular low silhouette or body shape.

Connected between the outer ends of the upper control arms 13 and the lower control arms 14 at each side of the vehicle is a steering knuckle 20. The connection of the upper and lower ends of the steering knuckle 20 to the upper and lower control arms 13, 14, respectively, is by means of ball joint assemblies which are shown in detail in FIGS. 6 and 7, respectively. The upper ball joint assembly (FIG. 6) includes a housing 74 that is threadably connected to the upper control arm 13. Within the housing 74 is a rockable stud 75 that is journalled in the housing 74 by means of a bearing element 76. The lower end of the threaded shank of the stud 75 is connected to the upper end of the steering knuckle assembly 20 by the nut 77.

FIG. 7 shows the lower ball joint assembly wherein a stud 80 is connected to the lower control arm extension 87 by means of a nut 81. The lower end of the stud 80 mounts a rotatable bearing ring 82 of the compression type that seats on the inner bearing shell 83 mounted in housing formation 84 in the steering knuckle arm 85 that is connected to the lower end of the knuckle 20 by bolt connectors 86 (see FIG. 2).

The steering knuckle arm 85 is a separate forging or casting that is detachably connected to the steering knuckle 20 by means of the bolt and nut connectors 86 (see FIG. 2). The two-piece steering knuckle and arm assembly 20, 85 lends itself to ready manufacture and it also facilitates replacement of the lower control arm ball joint assembly 80–84. With the particular two-piece steering knuckle and arm assembly 20, 85 it is thought to be obvious that such an arrangement readily facilitates the sub-assembly of the front wheel suspension on the K-frame member 11 so that the vehicle front end suspension running gear, engine and steering gear may be built up as a sub-assembly and thereafter added to the vehicle body B after complete build-up of the vehicle body B.

Each lower control arm 14 includes a rigidifying strut 51, one end potrion 51a (see FIG. 13) which is stepped to provide an end connection means that is seated in the extension piece 87 of the lower control arm 14. A nut 52 fastens the threaded end portion 51a of strut 51 to the control arm extension piece 87. The strut 51 extends forwardly and inwardly from the lower control arm 14 and passes through an opening in and is anchored to side wall formation 54 of the cross frame member 11a. The connection of the strut forward end portion 51b to the cross frame member 11a is by means of a resilient washer type universal joint connection. This universal joint connection comprises a pair of resilient doughnut type washers 55 on strut 51 mounted on opposite sides of the frame formation 54 with the washers compressed between a pair of metal washers 56 by means of the nut 57 threaded on the forward end 51b of the strut 51.

Each lower control unit is thus composed of two main components, that is, the load carrying arm 14 and the thrust strut 51 which oscillate in unison in response to vertical deflection of the associated road wheel. The strut 51 stabilizes the front wheel suspension assembly, particularly in fore and aft directions, so that increased loading and shock that may result during acceleration, braking and travel on rough roads is adequately resisted and cushioned.

The front end suspension also includes a stabilizing or sway bar 61 that interconnects the lower control arms 14 of the oppositely disposed road wheels. The sway bar 61 is substantially U-shaped in plan configuration so that its leg portions 61a extend longitudinally of the body B and have their free end portions connected to the rear end portions of the adjacent thrust links 51 by suitable insulated clamp 63. Clamp 63 is shown in detail in FIG. 11 and comprises an outer U-shaped member 65 that seats a block of rubber-like resilient material 66. Resilient block 66 is pierced by the sway bar end 61a so that the bar 61a is insulated from the clamp 65. Anchoring the resilient block 66 in the bight portion of the outer clamp member 65 is a cross bar 67. Cross bar 67 also serves as a seat for the lower side of the thrust link 51. A top cross bar 68 is detachably connected across the top of the clamp member 65 by the bolt and nut connector 69. Top cross bar 68 has a lip portion 68a that extends through a slot in the upper end portion of one leg of the outer clamp member 65 so that only one bolt and nut connector 69 is required to anchor the sway bar ends 61a to the adjacent thrust links 51.

From FIG. 9 it will be noted that the front leg 11a of the K-frame 11 has a U-shaped bracket 91 connected to it by a bolt and nut connector 90. Bracket 91 provides the support for an inverted Y-bolt 92 the shank portion of which is resiliently connected to the bracket 91 by compressed rubber doughnut washers 93. A nut 94 fixes the Y-bolt assembly to the bracket 91. Mounted in between the legs 92a of the Y-bolt is a block of rubber-like material 95 that is pierced by the end of the sway bar bight portion 61b. Block 95 is fixed in position by the cross bar 97 that is welded to the bolt legs 92a. From the foregoing description of the sway bar 61 and associated front wheel suspension assembly it is clear that the sway bar 61 is resiliently supported on the K-frame and resiliently connected to the associated lower control arms 14 so that the sway bar ends 61a move in unison with the associated lower control arms. The action and functions of the sway bar are identical to those known to the suspension experts and therefore additional description is not thought to be required. However, it should be pointed out that the disclosed sway bar mounting is extremely simple and economical yet effective and furthermore it may be readily added to or removed from the associated vehicle body wheel suspension assembly with a minimum of effort. This is quite advantageous because certain vehicle weights and vehicle uses may require a sway bar whereas other vehicles, using identical front wheel suspension parts, may not require a sway bar.

In addition to the novel torsion bar tension adjusting means 38-41 (see FIGS. 3, 5 and 14) and the improved mounting 63, 92 (see FIGS. 8-12) for the sway bar 61 herein disclosed, this invention also includes an improved type of lower control arm 14, 87 (see FIGS. 3, 4, 5 and 12-14) that cooperates with a novel steering knuckle arm 85, the associated torsion bar 30, thrust link 51, and sway bar 61. Certain of the novel features of the lower control arm assembly will now be described.

FIGS. 3, 4, 5 and 12-14 clearly show that the lower control arm is composed of substantially channel-shaped stampings 14a, 14b that are arranged in spaced relationship with the torsion bar stress adjusting crank 38 and the steering knuckle and ball joint connecting extension piece 87 interposed between and spacing the stampings 14a, 14b. The crank 38 and the extension 87 may be castings or forgings. Extension 87 is connected to the adjacent control arm stampings 14a, 14b by bolt and nut connectors or rivets as indicated at 98. The crank 38 is connected to the rotatable crank sleeve 35 by welding, splines or similar types of torque transmitting connections. The crank type torsion bar tension adjusting means 38-41 has previously been described. However, the extension piece 87 serves several functions and it will now be described in detail.

From FIGS. 5 and 7 it is clear that the lower control arm extension piece 87 has an integrally formed outwardly projecting, ring formation 87a that receives the tapered shank of the lower ball joint stud 80. Ring 87a provides the interconnection between the associated wheel mounted ball joint housing 85 and the suspension lower control arm 14. Because the extension piece 87 can be readily removed from the control arm 14 the repair or replacement of the associated ball joints is materially facilitated. Extension piece 87 also includes a bore 87b to seat the rear of the thrust rod 51 (see FIG. 13). Extension 87 thus gives a rigid thrust reaction surface.

The spaced stampings 14a and 14b that provide the side walls of the lower control arms 14 are each pierced by semi-circular openings 40 (see FIGS. 3, 5 and 14) that support therebetween in bridging relationship the nut bar 41. Bar nut 41 has circumferentially extending grooves 41a adjacent each end that seat on the edges of the openings 40 in the wall members 14a and 14b so that the nut bar 41 can shift during adjustment of the bolt 39 to cause a normally directed force to be applied to the end portion 38a of the crank arm 38.

In addition to the aforementioned portions of the lower control arm 14, either the extension piece 87 or the rear side member 14b can be shaped to provide an abutment surface 99 (see FIG. 12) that is adapted to be engaged by an outwardly projecting stud 100 on the rotatable steering knuckle 20 to provide the wheel stop means to limit swinging movement of the steerable front vehicle wheels.

Control arm side wall stampings 14a, 14b (see FIGS. 3 and 5) are also preformed and pierced at 101 to provide the mounting means for the lower end of the shock absorber 24. A bolt and nut connector 102 extends crosswise through the mounting means 101 and through the ring 103 at the lower end of the shock absorber 24 to pivotally anchor the lower end of shock absorber 24 to the lower control arm 14. Here again is brought out another advantage of the built-up lower control arm 14 for use with a torsion bar wheel suspension assembly.

We claim:

1. In a vehicle, a wheel supporting frame, an upright wheel carrying member, means connecting said wheel carrying member to said supporting frame for rising and falling movement relative thereto including a control arm extending transversely of said frame and connected thereto for swinging movement about a pivot shaft extending longitudinally of said frame, the pivot connection between said arm and said supporting frame including a concentrically arranged sleeve carried by and rotatable relative to said arm and journalled on said pivot shaft, a torsion bar spring having one end portion nonrotatably connected to said sleeve and the other end portion fixedly anchored to said supporting frame, and means to torsionally stress said torsion bar spring comprising crank means fixedly connected to said sleeve and anchored to said control arm by adjustable means providing for pre-stressing of said torsion bar spring, said control arm comprising an elongated stamping having means at one end thereof to journal said rotatable sleeve in said control arm and means at the other end of said arm providing the connection means between said control arm and said wheel carrying member, said stamped control arm having journal formations intermediate its end portions to seat a bolt and nut crank means forming said adjustable means, said formations comprising aligned openings in spaced wall portions of said control arm stamping having arcuate portions to journal arcuate portions or a shiftable, bar-type, nut member that threadably receives an adjusting bolt, said shiftable nut member providing means whereby the adjusting bolt can be selectively positioned relative to said crank means to continuously apply a compression load to the crank means in a direction substantially normal thereto for all adjusted positions of the crank means within the normal stress adjusting range of said torsion bar.

2. A vehicle wheel suspension control arm comprising a pair of stampings having transversely directed, aligned, bores adjacent one end thereof, a sleeve extending through and rotatably journalled in said bores, a crank arm projecting radially from said sleeve, a pair of transversely directed, aligned, apertures in said stampings intermediate the ends thereof having arcuately shaped peripheral portions, a bar-type nut member extending through and journalled on said arcuately shaped peripheral portions of the aligned apertures in said stampings, a bolt member threadably engaged with said nut member having portions projecting therefrom and compressively engageable with said crankarm to effect rotation thereof and provide an anchor therefor, the journaling of the bar nut on the arcuately shaped peripheral portions of the aligned apertures in said stampings providing adjusting means to maintain said bolt member substantially normal to the crankarm for all adjusted positions of the crankarm within its normal operating range, and means carried by the other end of said stampings providing a connection for rotatably supporting a steerable vehicle wheel assembly, said last-mentioned means comprising an end portion on said stampings having a ball joint supporting socket and a thrust rod supporting socket therein, said other end of said stampings also including formations to support one end of a shock absorber unit and a preformed stop to limit movement of the associated vehicle wheel about a substantially vertical axis of steering movement.

References Cited by the Examiner
UNITED STATES PATENTS

| | | | |
|---|---|---|---|
| 2,049,904 | 8/36 | Girling | 280—96.2 |
| 2,148,029 | 2/39 | Matthews | 267—57 |
| 2,596,922 | 5/52 | Thoms | 280—96.2 |
| 2,652,264 | 9/53 | Booth | 280—96.2 |
| 2,913,268 | 11/59 | Booth | 280—96.2 |
| 2,972,489 | 2/61 | Collier | 267—57 |
| 2,997,313 | 8/61 | Wall | 280—106.5 |
| 3,027,177 | 3/62 | Karlstad | 280—124.3 |

PHILIP ARNOLD, *Primary Examiner.*

BENJAMIN HERSH, A. HARRY LEVY, LEO FRIAGLIA, *Examiners.*